Figure 1:
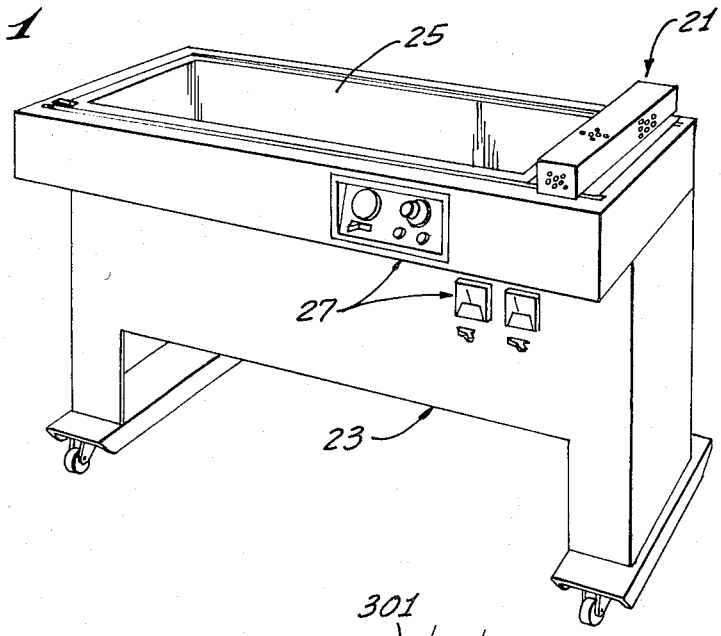
Figure 12:
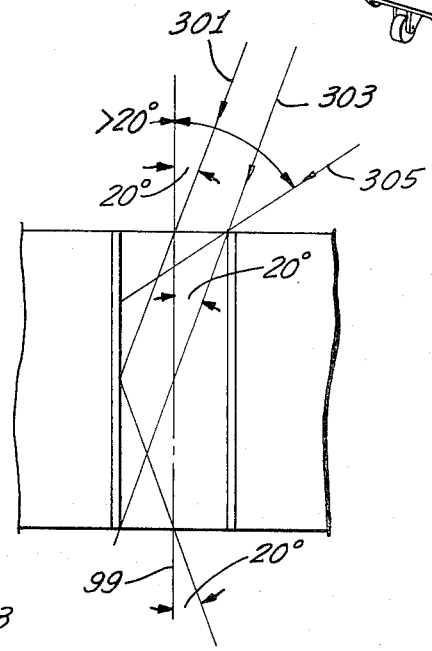
Figure 11:
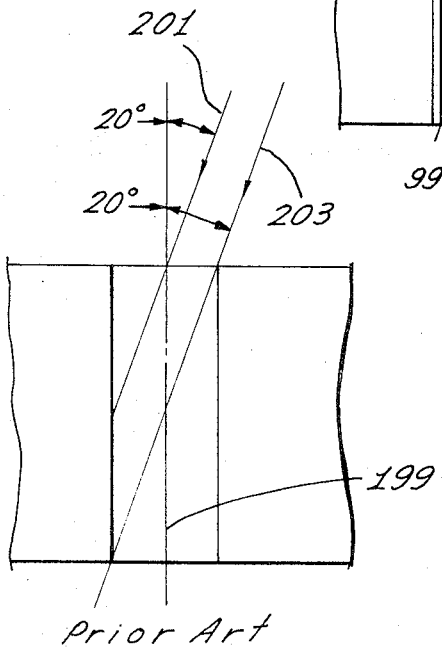
Figure 3:
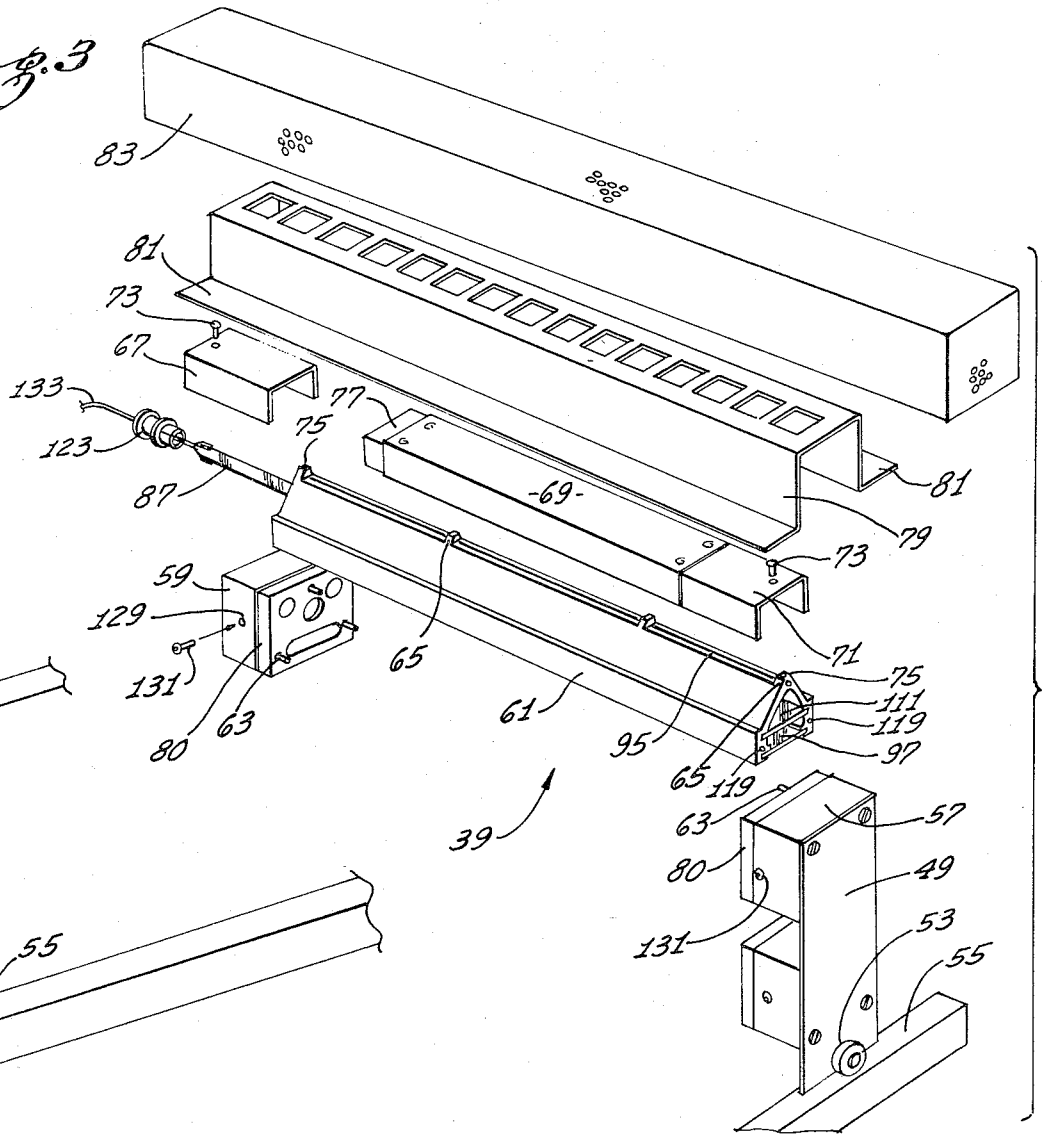
Figure 2:
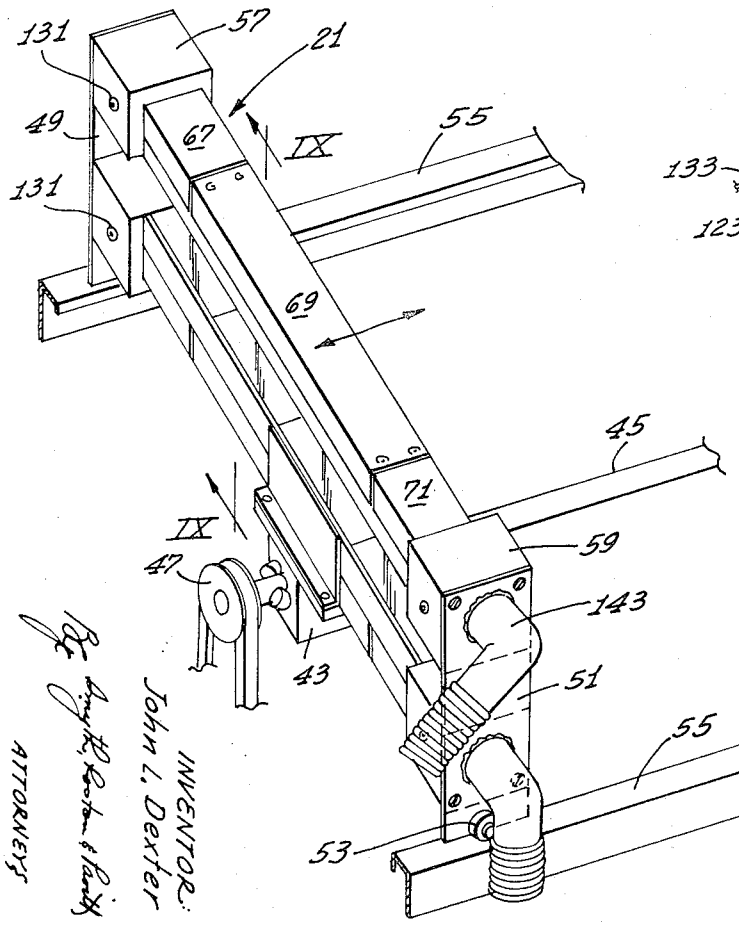
Figure 4:
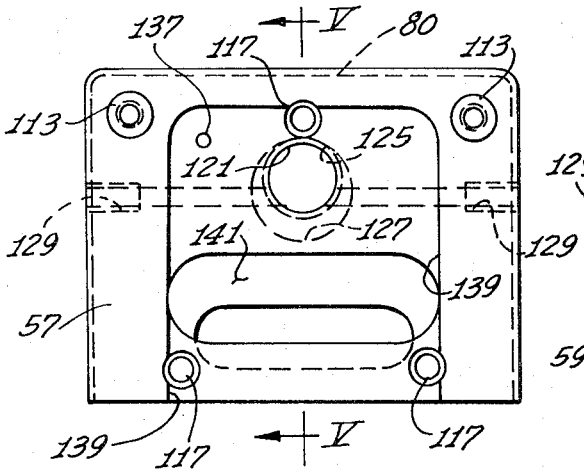
Figure 6:
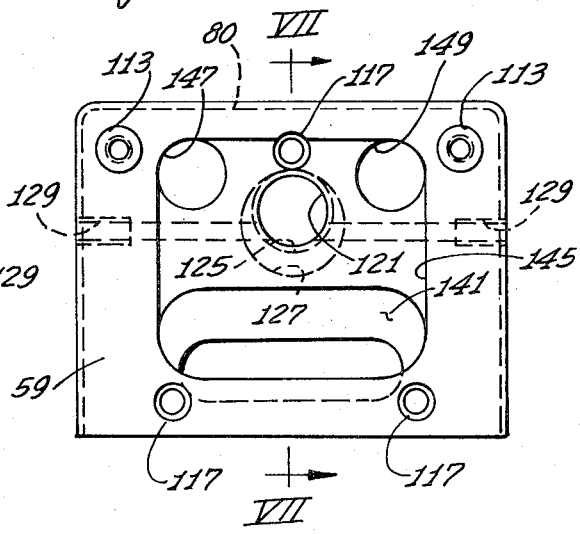
Figure 5:
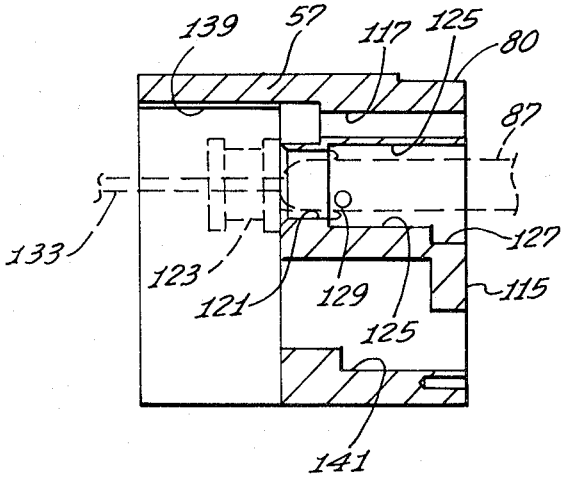
Figure 7:
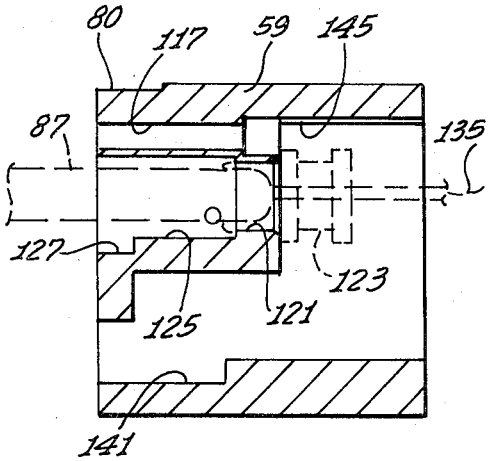
Figure 8:
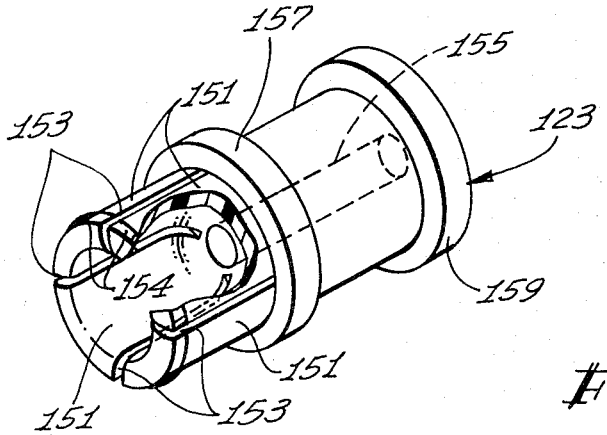
Figure 9:
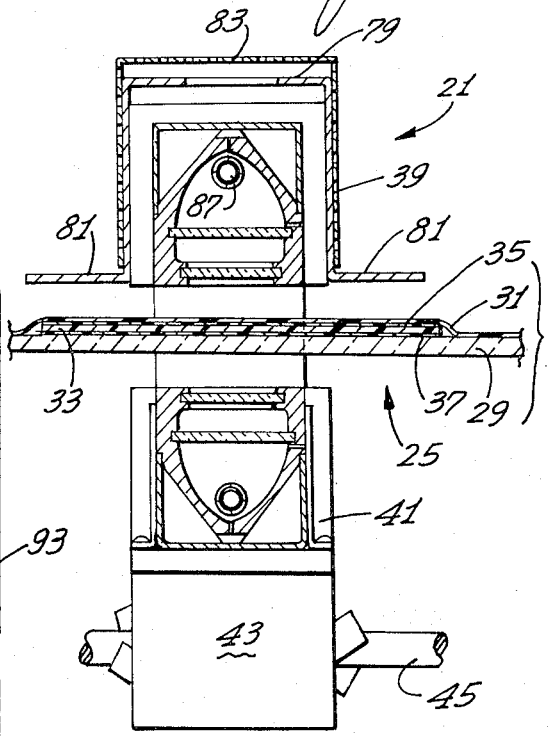
Figure 10:
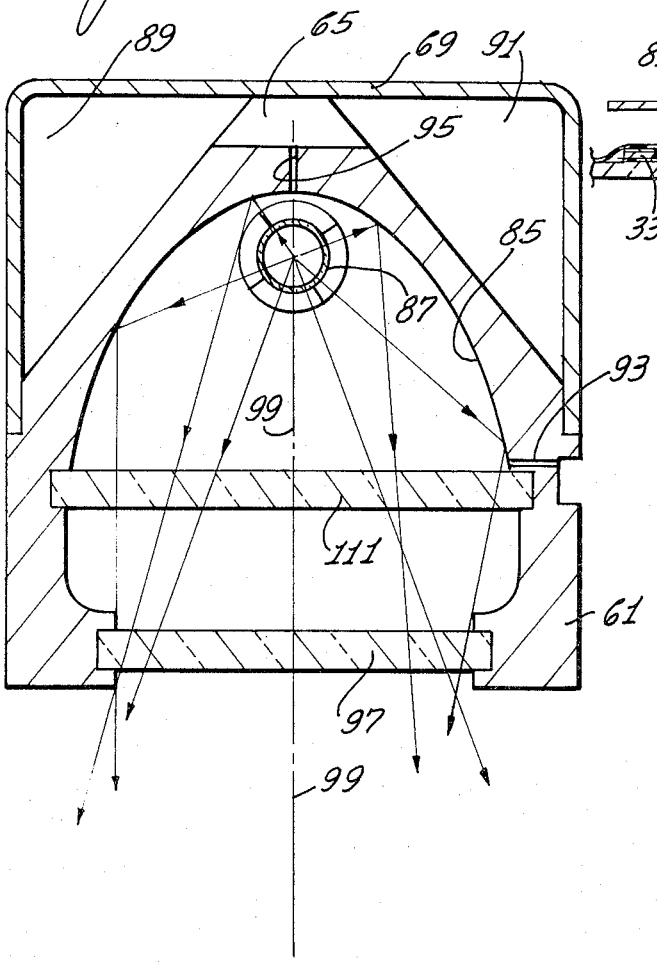

DEFENSIVE PUBLICATION

UNITED STATES PATENT OFFICE

Published at the request of the applicant or owner in accordance with the Notice of Dec. 16, 1969, 869 O.G. 687. The abstracts of Defensive Publication applications are identified by distinctly numbered series and are arranged chronologically. The heading of each abstract indicates the number of pages of specification, including claims and sheets of drawings contained in the application as originally filed. The files of these applications are available to the public for inspection and reproduction may be purchased for 30 cents a sheet.

Defensive Publication applications have not been examined as to the merits of alleged invention. The Patent Office makes no assertion as to the novelty of the disclosed subject matter.

PUBLISHED OCTOBER 3, 1972

903 O.G. 7

T903,018
OPTICAL SYSTEM FOR A PHOTOSENSITIVE MATERIAL PRINTER

John L. Dexter, Santa Barbara, Calif., assignor to Gyrex Corporation, Santa Barbara, Calif.

Continuation of abandoned application Ser. No. 877,160, Nov. 17, 1969. This application Dec. 8, 1971, Ser. No. 206,212

Int. Cl. G03b *27/10, 27/16*
U.S. Cl. 355—84
4 Sheets Drawing. 21 Pages Specification

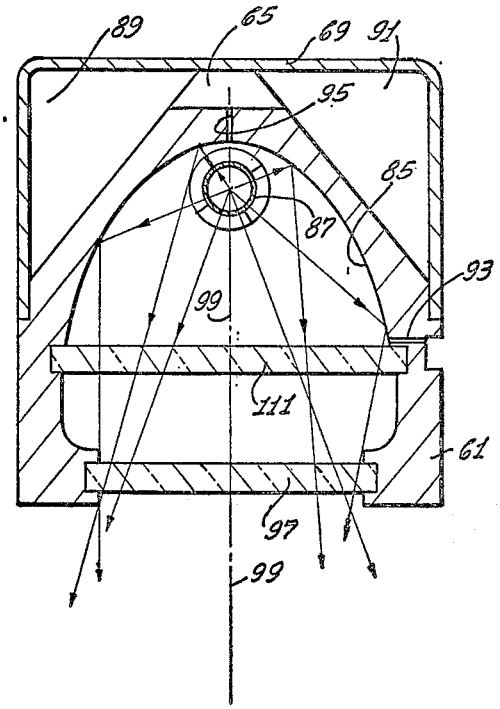

An optical system for exposure of either or both sides of a workpiece which is sensitive to light rays. The described embodiment comprises a pair of collimated mercury vapor tubular lamps positioned close to the workpiece and mounted in opposed semi-elliptical reflectors. An infrared ray filter (111) is mounted adjacent the mouth of each reflector, intermediate the lamp and a fiber optic plate (97). The fiber optic plates segregate the light rays emanating from the lamps so that only those rays which are within a predetermined range of angles relative to a perpendicular plane reach the workpiece. The filters absorb nearly all of the infrared rays emitted toward the optic plates, thereby protecting the plates and the workpiece from heat generated by the lamps. Each lamp is fixed within its reflector by means of insulators mounted within housing end caps which are formed with airflow passages for cooling the lamp, the infrared ray filter, and the reflector. An insulator for holding the ends of the tubular lamp comprises a body having flexible mmebers on one end thereof which fit into a bore and form a seat for the end of a lamp. An axial passage through the body provides a passage for the electrical wire leading to the end of the lamp and a pair of shoulders are formed on the body for axially positioning the insulator in the bore and for manually gripping the insulator during installation and removal.

Oct. 3, 1972 J. L. DEXTER T903,018

OPTICAL SYSTEM FOR A PHOTOSENSITIVE MATERIAL PRINTER

Original Filed Nov. 16, 1969 4 Sheets-Sheet 1

INVENTOR:
John L. Dexter

By Smyth, Pavitt & Pavitt
ATTORNEYS

OPTICAL SYSTEM FOR A PHOTOSENSITIVE MATERIAL PRINTER

Original Filed Nov. 16, 1969 4 Sheets-Sheet 2

INVENTOR:
John L. Dexter

By Smyth, Roston & Pavitt

ATTORNEYS

OPTICAL SYSTEM FOR A PHOTOSENSITIVE MATERIAL PRINTER

Original Filed Nov. 16, 1969 4 Sheets-Sheet 3

INVENTOR:
John L. Dexter

By Smyth, Roston & Pavitt
ATTORNEYS

OPTICAL SYSTEM FOR A PHOTOSENSITIVE MATERIAL PRINTER

Original Filed Nov. 16, 1969 4 Sheets-Sheet 4

INVENTOR:
John L. Dexter

By Smyth, Roston & Pavitt

ATTORNEYS